United States Patent
Griffin et al.

(10) Patent No.: US 12,010,643 B2
(45) Date of Patent: Jun. 11, 2024

(54) RFID BROADCAST AUTHENTICATED ACTIVATION

(71) Applicant: RED HAT, INC., Raleigh, NC (US)

(72) Inventors: Leigh Griffin, Waterford City (IE); Pierre-Yves Chibon, Saint-pol-de-Léon (FR)

(73) Assignee: Red Hat, Inc., Raleigh, NC (US)

( * ) Notice: Subject to any disclaimer, the term of this patent is extended or adjusted under 35 U.S.C. 154(b) by 344 days.

(21) Appl. No.: 17/513,328

(22) Filed: Oct. 28, 2021

(65) Prior Publication Data

US 2023/0134542 A1   May 4, 2023

(51) Int. Cl.
| | |
|---|---|
| *H04W 60/04* | (2009.01) |
| *H04W 4/80* | (2018.01) |
| *H04W 12/00* | (2021.01) |
| *H04W 12/06* | (2021.01) |
| *H04W 12/08* | (2021.01) |

(52) U.S. Cl.
CPC ............. *H04W 60/04* (2013.01); *H04W 4/80* (2018.02); *H04W 12/009* (2019.01); *H04W 12/06* (2013.01); *H04W 12/08* (2013.01)

(58) Field of Classification Search
CPC ... H04W 12/009; H04W 12/06; H04W 12/08; H04W 4/80; H04W 60/04; H04W 12/088; H04W 12/47; H04W 12/71; H04W 4/06; H04W 84/18; Y02D 30/70
USPC ....................................................... 455/435.1
See application file for complete search history.

(56) References Cited

U.S. PATENT DOCUMENTS

| | | |
|---|---|---|
| 10,554,650 B2 | 2/2020 | Davis |
| 2006/0255131 A1* | 11/2006 | Stewart ................. G06K 7/0008 235/383 |
| 2008/0148393 A1 | 6/2008 | Wendt |
| 2015/0161420 A1 | 6/2015 | Mo et al. |
| 2017/0308692 A1* | 10/2017 | Yano ......................... G07G 1/12 |
| 2021/0392499 A1* | 12/2021 | Kirkeby ................ H04W 12/08 |
| 2022/0374621 A1* | 11/2022 | Biswas ............. G06K 7/10366 |
| 2023/0355995 A1* | 11/2023 | Forsell .................. H04W 12/06 |

FOREIGN PATENT DOCUMENTS

CN   104648320   5/2015

OTHER PUBLICATIONS

Vedova, P.D. et al. (2014). "Gold nanoparticle-based sensors activated by external radio frequency fields," small, pp. 9.

* cited by examiner

*Primary Examiner* — Hirdepal Singh
(74) *Attorney, Agent, or Firm* — Womble Bond Dickinson (US) LLP

(57) ABSTRACT

A radio frequency identification (RFID) broadcast signal is received. The RFID broadcast signal includes a broadcast identification value. The broadcast identification value is compared to an assigned identification value. Responsive to the broadcast identification value matching the assigned identification value, a processing device transitions a network interface to an active state.

17 Claims, 12 Drawing Sheets

RFID BROADCAST AUTHENTICATED ACTIVATION

TECHNICAL FIELD

[0001] Aspects of the present disclosure relate to networked devices, and more particularly, to broadcast activation of members of a mesh network.

BACKGROUND

A mesh network is a network topology that includes nodes (i.e. bridges, switches, internet-of-things (IOT) devices, and other infrastructure devices) that are interconnected directly and non-hierarchically to other nodes and interact to communicate within the mesh. The interconnected format of the nodes allows for multiple nodes to participate in the relay of information.

Mesh networks may be formed from multiple types of devices, including nanotechnology, or nanotech, devices. Nanotech is an emerging technology that includes devices on a miniature scale, including atomic, molecular, and supramolecular scale. For example, nanotech devices may have a longest dimension that is less than 100 nm. The reduced size of such devices allows for a wide range of potential applications, including biological applications. Nanotech devices can be embedded into living cells and can control elements of cell function through protein synthesis and message passing. Large numbers of nanotech devices, may be organized in a mesh network.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
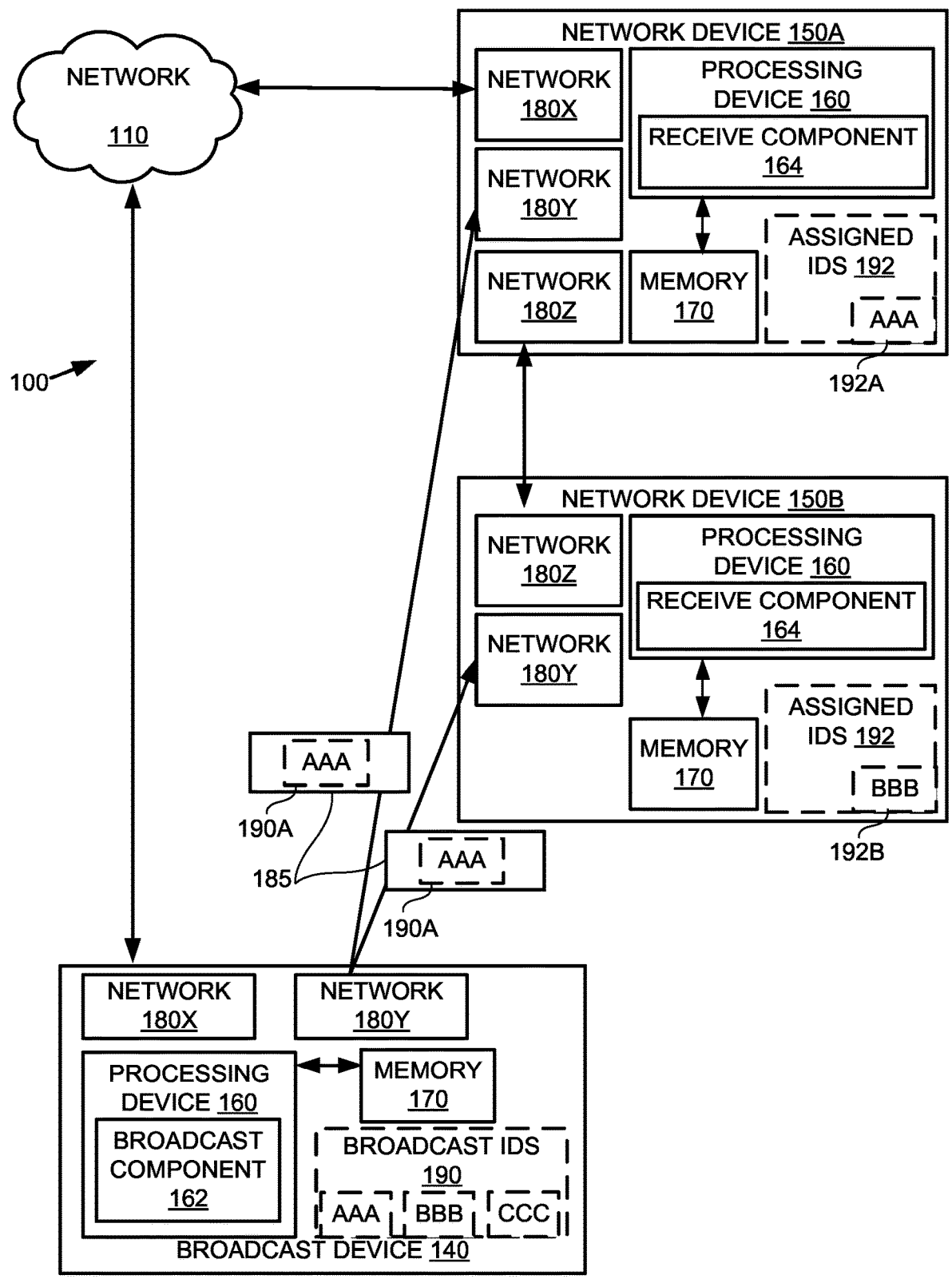
FIG. 1 is a block diagram that illustrates an example of a network architecture, in accordance with one or more aspects of the present disclosure.

Research in nanotech is advancing at a rapid pace and challenges are emerging about how best to protect and ensure that the technology is not misused. Embedded biological devices, for example, are pursuing a way to receive information from trusted sources with reduced power requirements. Biological nanotech devices, for example, may be difficult to retrieve and/or recharge, so power efficiency may be a useful characteristic of such devices.

In conventional devices where power efficiency is an issue, such as nanotech, a way to save energy includes turning off non-essential elements when they are not being used. To this end, turning off a network interface of the device when there is no data to receive or send would allow a reduction in power usage. However, powering off the network interface may also reduce the mechanisms for communication. Thus, it may be difficult to communicate with the device to turn the network interface back on. For example, in a mesh network, it may be necessary to communicate with a node of the mesh to share data within the mesh. A solution is needed to allow for the enablement of the dormant network interface that does not use the network interface itself.

As described herein, a broadcast network, such as radio frequency identification (RFID), may be used as a mechanism to trigger the activation of the network interface. RFID allows for an electromagnetic transmission to be broadcast from a transmitting device, typically called an RFID reader, to an RFID receiver. Some RFID implementations may receive communications without a power source or with a reduced power source compared to conventional networking devices, as the RFID receiver may derive power from the RFID transmission itself. Upon receiving the electromagnetic transmission from a nearby RFID reader device, the network interface of the device may be activated and a communication can be established to the device (e.g., between a bio-embedded device and the outside system).

A challenge with such a broadcast mechanism includes the malicious activation of the device (e.g., activation by a device/entity that is not authorized to perform the operation). In such a configuration, authentication in a conventional device may require that the network interface of the device be active. Thus, even if the authentication process were to successfully recognize the lack of authorization, the process of authorization itself would waste power.

As discussed herein, nanotech devices may be organized in a mesh network. Another challenge in implementation in which multiple devices (e.g., nanotech devices) are organized in a mesh network is the activation of multiple devices at the same time due to the devices occupying a relatively small area. For example, hundreds or thousands of nanotech devices may occupy a space that is covered by a broadcast signal from an RFID reader. With conventional devices, it may be difficult to isolate just one of the devices for activation. Moreover, the cost of an inadvertent activation is magnified in such a scenario, as the power inefficiency/loss of a single device is multiplied by each of the devices within the RFID reader range (e.g., the hundreds or thousands of devices).

Aspects of the disclosure address the above-noted and other deficiencies by encoding a broadcast signal, such as an RFID pulse sequence, to utilize as an authenticated control signal to a device. The broadcast signal may be modulated to provide a recognizable pattern that may indicate a unique device or a group of devices for activation. For example, an RFID reader may transmit a modulated RFID signal to a group of devices, such as nanotech devices. The nanotech devices may be able to decode the modulated RFID signal to determine if they are identified by the pattern included in the encoded signal. If the pattern from the signal matches a pattern associated with a given device, the device can activate its network interface s (or other functions) and perform additional communications or operations. If the pattern from the signal does not match a pattern associated with the given device, the device may remain in a low-power state, increasing its power efficiency. This approach allows for other devices in the same vicinity to receive the RFID pulse signal, but ignore it if the patterns do not match.

As compared to conventional devices, embodiments of the present disclosure allow for authenticated communication that does not require the use of stored power and/or utilizes less power than maintaining a network interface for communication. In some embodiments, since the power to manage the waking and checking of authorization may be primarily, or totally, provided by the RFID transmission itself rather than on-board power sources, power efficiency may be increased. Moreover, the use of an authenticated broadcast signal may address the problem of activating multiple, unnecessary, network devices in response to a broadcast signal. By embedding the authentication patterns/identifications within the broadcast signal itself, only those networking devices for which the broadcast signal is intended may be activated. Since checking the broadcast signal may use little to no additional stored power, embodiments of the present disclosure may benefit from more secure and power efficient operation as compared to conventional devices.

Although aspects of the disclosure may be described in the context of a mesh network and/or nanotech devices, embodiments of the disclosure may be applied to any computing system and/or network, such as, for example, a network in which power efficiency may be obtained by rendering network interface s dormant. As used herein, the term "and/or" includes any and all combinations of one or more of the associated listed items.

FIG. 1 depicts a high-level component diagram of an illustrative example of a mesh network architecture 100, in accordance with one or more aspects of the present disclosure. However, although the discussion with respect to FIG. 1 describes a mesh network, other network architectures (e.g., non-mesh) are possible without deviating from the scope of the present disclosure, and the implementation of a computer system utilizing examples of the disclosure are not necessarily limited to the specific architecture depicted by FIG. 1.

As shown in FIG. 1, mesh network architecture 100 includes a plurality of computing devices, including a broadcast device 140 and a plurality of network devices 150. For convenience of description, only two network devices 150, a first network device 150A and a second network device 150B, are illustrated, but it will be understood that additional network devices 150 may be present without deviating from the scope of the present disclosure.

FIG. 1 and the other figures may use like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral.

The broadcast device 140 and network devices 150 include one or more processing devices 160, memory 170, which may include volatile memory devices (e.g., random access memory (RAM)), non-volatile memory devices (e.g., flash memory) and/or other types of memory devices, and one or more network interface s 180. In certain implementations, memory 170 may be non-uniform access (NUMA), such that memory access time depends on the memory location relative to processing device 160. It should be noted that although, for simplicity, a single processing device 160 is depicted in each of the broadcast device 140 and network devices 150 depicted in FIG. 1, other embodiments of broadcast device 140 and network devices 150 may include multiple processing devices, storage devices, or other devices. Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like. Different ones of the broadcast device 140 and network devices 150 may have different types of processing device 160.

The broadcast device 140 and network devices 150 may be a server, a mainframe, a workstation, a personal computer (PC), a mobile phone, a palm-sized computing device, etc. In embodiments, one or more of the broadcast device 140 and network devices 150 may be a nanotech device. For clarity, some components of the broadcast device 140 and network devices 150 are not shown.

In some embodiments, the broadcast device 140 and the network devices 150 may be directly or indirectly communicatively coupled through one or more of the network interface s. For example, the broadcast device 140 and one or more of the network devices 150 may be coupled to each other (e.g., may be operatively coupled, communicatively coupled, may communicate data/messages with each other) via network 110. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI® hotspot connected with the network 110 and/or a wireless carrier system that can be implemented using various data processing equipment, communication towers (e.g., cell towers), etc. The network 110 may carry communications (e.g., data, message, packets, frames, etc.)

between the various components of the broadcast device 140 and one more of the network devices 150.

The broadcast device 140 and the network devices 150 may include a plurality of network interface s 180. The network interface s 180 may communicate with a plurality of network types. The variety of network interface s 180 may allow for various configurations of network connectivity between the broadcast device 140 and the network devices 150.

For example, broadcast device 140 may include a first network interface 180X and a second network interface 180Y. The first network interface 180X may communicate with the network 110. The second network interface 180Y may transmit wireless transmissions. For example, the second network interface 180Y may broadcast (e.g., from broadcast device 140) an electromagnetic transmission capable of being received by network devices 150.

A first network device of the network devices 150, e.g., first network device 150A, may also include the first network interface 180X. Thus, the first network device 150A may be capable of communicating with the broadcast device 140 over network 110 using the first network interface 180X.

A second network device of the network devices 150, e.g., second network device 150B, may not include the first network interface 180X. Thus, the second network device 150B may not be capable of directly communicating over network 110. Instead, the second network device 150B may be communicatively coupled to the network 110 through a third network interface 180Z that is coupled to the first network device 150A. That is to say that the first network device 150A may serve as a relay for communications between the second network device 150B and the network 110. For example, the second network device 150B may be capable of communicating with the broadcast device 140 through the third network interface 180Z between the first and second network devices 150A, 150B and through the first network interface 180X between the first network device 150A and the broadcast device 140 (over network 110). In some embodiments, the third network interface 180Z may include a wireless technology, such as WIFI®, Bluetooth, Home radio frequency (Home RF), to name a few examples.

The broadcast device 140, the first network device 150A, and the second network device 150B may form a mesh network. The mesh network may provide an interconnected and non-hierarchical network between members of the mesh. Devices (e.g., network devices 150) may join or leave the mesh network, and communication between members of the mesh over various network connections of the mesh may be dynamically routed responsive to changes in the mesh configuration.

The first network device 150A and the second network device 150B may also include a second network interface 180Y that is compatible with the second network interface 180Y of the broadcast device 140. Thus, the first network device 150A and the second network device 150B may be able to receive an electromagnetic signal 185 that is broadcast by the broadcast device 140 utilizing the second network interface 180Y. In some embodiments, the second network interface 180Y may be an RFID network interface 180Y, as will be described further herein.

One or more of the network devices 150 may be capable of selectively controlling power (e.g., activating or deactivating) one or more components of the network device 150. As used herein, deactivating an electrical component means transitioning the component to an inactive or dormant state and/or transitioning the component to a power-reduced mode of operation from a higher-power mode of operation. Activating a component means transitioning the component to an active state from an inactive or dormant state and/or transitioning the component to a higher-power mode of operation from a power-reduced mode of operation.

For example, the network devices 150 may be capable of selectively deactivating from an active state, and activating from a deactivated state, one or more of the first network interface 180X, the third network interface 180Z, the memory 170, and/or the processing device 160. In some embodiments, the control may be provided by, for example, an electrical switch or other electronic mechanism. Selectively deactivating one or more of the first network interface 180X, the third network interface 180Z, the memory 170, and/or the processing device 160 may reduce a power consumption of the network device 150. In some embodiments, the network device 150 may deactivate one or more of the first network interface 180X, the third network interface 180Z, the memory 170, and/or the processing device 160 after the network device has been idle for a defined period of time, or on another defined schedule.

In some embodiments, processing device 160 of the broadcast device 140 may execute a broadcast component 162. The broadcast component 162 may broadcast a message as part of a broadcast signal 185 to the network devices 150 over the second network interface 180Y to cause the selective activation (e.g., a transition from a dormant, inactive, or power-reduced mode of operation to an activate or full-power mode of operation) of one or more components of one or more of the network devices 150. In some embodiments, the number of network devices 150 that are activated by the broadcast signal 185 from the broadcast device 140 may be less than all of the network devices 150. In some embodiments, a single network device 150 (e.g., first network device 150A) may be activated by the broadcast signal 185.

The broadcast component 162 may determine one or more of the network devices 150 to be activated. The broadcast component 162 may select, from a data store of broadcast identifications (IDs) 190, a first broadcast ID 190A. The first broadcast ID 190A may uniquely identify the one or more of the network devices 150 to be activated. For example, the first broadcast ID 190A may be a numerical value (e.g., a code) and/or pattern that is mapped to the one or more of the network devices 150 to be activated. In some embodiments, the first broadcast ID 190A may map to a single one of the network devices 150.

To activate the one or more of the network devices 150, the processing device 160 may execute the broadcast component 162 to broadcast a signal (e.g., an electromagnetic signal) 185 that contains the first broadcast ID 190A. In some embodiments, the first broadcast ID 190A may be encoded within the broadcast signal 185 by signal modulation or other method. Further details regarding methods by which the first broadcast ID 190A may be encoded within the broadcast signal 185 will be described herein.

The network devices 150 within range of the broadcast signal 185 may receive the broadcast signal 185 on the second network interface 180Y. The processing device 160 of the network devices 150 may execution a receive component 164. In some embodiments, the processing device 160 of the network devices 150 may be a processor or other processing device that is associated with or dedicated to the second network interface 180Y. For example, the processing device 160 may be a processor associated with an RFID tag.

The receive component 164 may decode the first broadcast ID 190A from the broadcast signal 185. The receive component 164 may compare the first broadcast ID 190A with a data store of one or more assigned IDs 192. The assigned IDs 192 of each of the network devices 150 may include one or more ID values that are mapped to the respective network device 150. For example, in FIG. 1, the assigned IDs 192 of the first network device 150A may include a first assigned ID 192A that matches the broadcast ID 190A, the assigned IDs 192 of the second network device 150B may include a second assigned ID 192B that does not match the broadcast ID 190A.

Responsive to the receive component 164 determining that the decoded first broadcast ID 190A matches an assigned ID of the assigned IDs 192, the receive component 164 may activate one or more of the components of the network device 150. Responsive to the receive component 164 determining that the decoded first broadcast ID 190A does not match an assigned ID of the assigned IDs 192, the receive component 164 may take no further action (e.g., until another broadcast message 185 is received).

For example, referring to FIG. 1, the receive component 164 of the first network device 150A may determine that the first broadcast ID 190A of the broadcast message 185 matches one (e.g., assigned ID 192A) of its assigned IDs 192. The processing device 160 of the first network device 150A may activate one or more of its components (e.g., first network interface 180X and/or third network interface 180Z). In contrast, the receive component 164 of the second network device 150B may determine that the first broadcast ID 190A of the broadcast message 185 does not match any of its assigned IDs 192 and not activate any of its deactivated components.

Figure 2A:
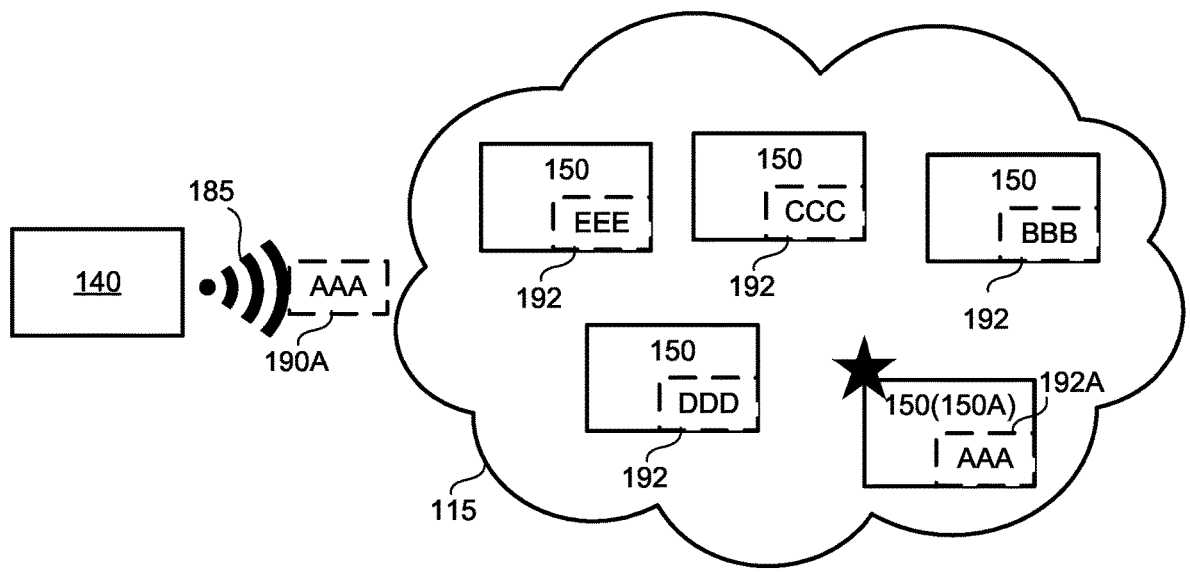
FIGS. 2A and 2B are schematic diagrams illustrating example scenarios of the broadcast activation of FIG. 1, in accordance with embodiments of the disclosure.
Figure 2B:
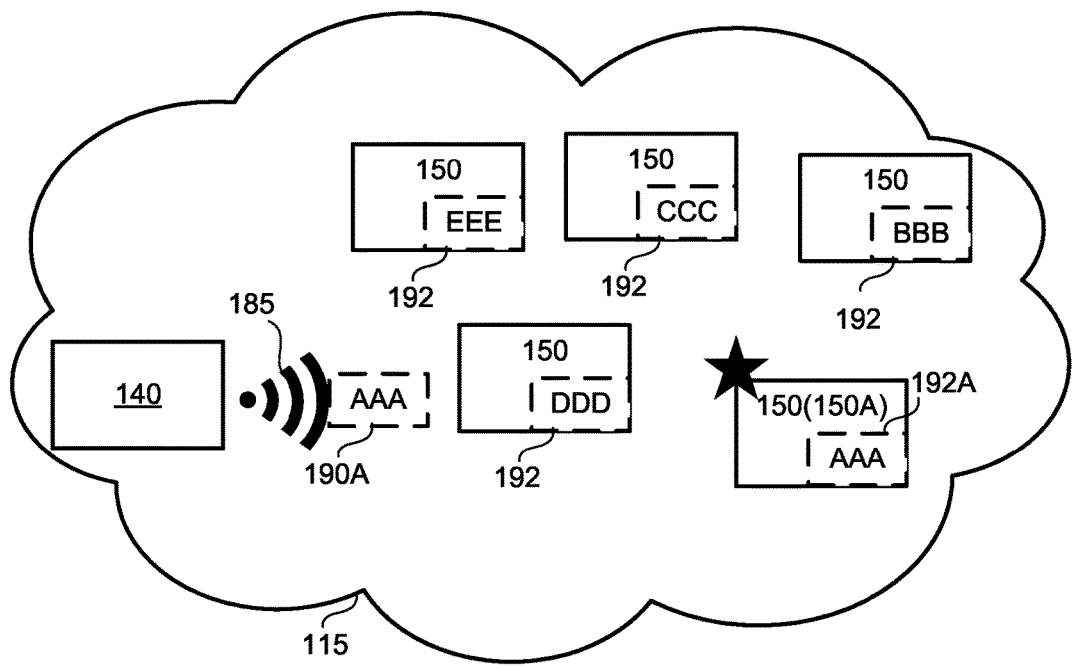

FIGS. 2A and 2B are schematic diagrams illustrating example scenarios of the broadcast activation of FIG. 1, in accordance with embodiments of the present disclosure. Referring to FIGS. 1 and 2A, a plurality of network devices 150 may be coupled within a mesh network 115. Each of the network devices 150 may include at least one assigned ID 192. In FIG. 2A, all of assigned IDs 192 are illustrated as being unique, but the embodiments of the present disclosure are not limited to such a configuration.

As described herein, the plurality of network devices 150 may be coupled directly and indirectly within the mesh network 115. The plurality of network devices 150 may each include one or more network interface s (e.g., network interface s 180 in FIG. 1). Each of the plurality of network devices 150 may have at least one network interface (e.g., the second network interface 180Y in FIG. 1) that receives a broadcast message 185 from a broadcast device 140.

Each of the network devices 150 may have at least one component (e.g., a network interface, a processing device, a memory device, a storage device, etc.) that is in a dormant state (e.g., to save power). In some embodiments, at least one network interface (e.g., the second network interface 180Y in FIG. 1) may have enough power to receive the broadcast message 185 from the broadcast device 140, or may receive sufficient power from the broadcast message 185 to process the contents of the broadcast message 185.

The broadcast device 140 may transmit a broadcast message 185 containing a broadcast ID 190A. As an example, the broadcast ID 190A is illustrated as 'AAA' in FIG. 2A. The broadcast message 185 may be received by each of the plurality of network devices 150. Each of the network devices 150 may compare the received broadcast ID 190A to one or more assigned IDs 192 stored on the network device 150. If the received broadcast ID 190A matches one of the assigned IDs 192, the network device 150 having the matching assigned ID 192 may activate one or more of the dormant components of the network device 150. For example, the network device 150 may transition one or more components of the network device 150 (e.g., a network interface, a processing device, a memory device, a storage device, etc.) that is in a dormant state to an active state.

In FIG. 2A, an example network device 150A is shown as having an assigned ID 192A ("AAA") that matches the broadcast ID 190A ("AAA") of the broadcast message 185. Thus, the network device 150A activates one or more of its components (shown schematically with a star) in response to the matching assigned ID.

The operations illustrated in FIGS. 1 and 2A allow for one or more of the network devices 150 to be activated in response to a broadcast message. The activation may allow for the network device 150 to have one or more components in a power-saving state that is still capable of being activated, when requested, in a power efficient manner. For example, in some embodiments, the network interface that receives the broadcast message 185 may be a low power network interface, or a network interface that is capable of being powered by the broadcast message 185 itself.

Though FIG. 2A illustrates an example in which the broadcast device 140 is external to the mesh network 115, the embodiments of the present disclosure are not limited to this configuration. As illustrated in FIG. 2B, the broadcast device 140 may also be within the mesh network 115 itself.

Referring to FIG. 2B, the broadcast device 140 may be interconnected with one or more of the network devices 150 within the mesh network 115. In some embodiments, the broadcast device 140 may have a same or similar configuration as other ones of the network devices 150. In some embodiments, a particular network device 150 may perform the function/role of a broadcast device 140 (e.g., broadcast an activation broadcast message) in some scenarios and may perform the function/role of a network device 150 (e.g., receive an activation broadcast message) in other scenarios. Stated a different way, a broadcast device 140 need not be dedicated to that function, and any of the network devices 150 capable of sending a broadcast message 185 may perform that function.

Figure 3:
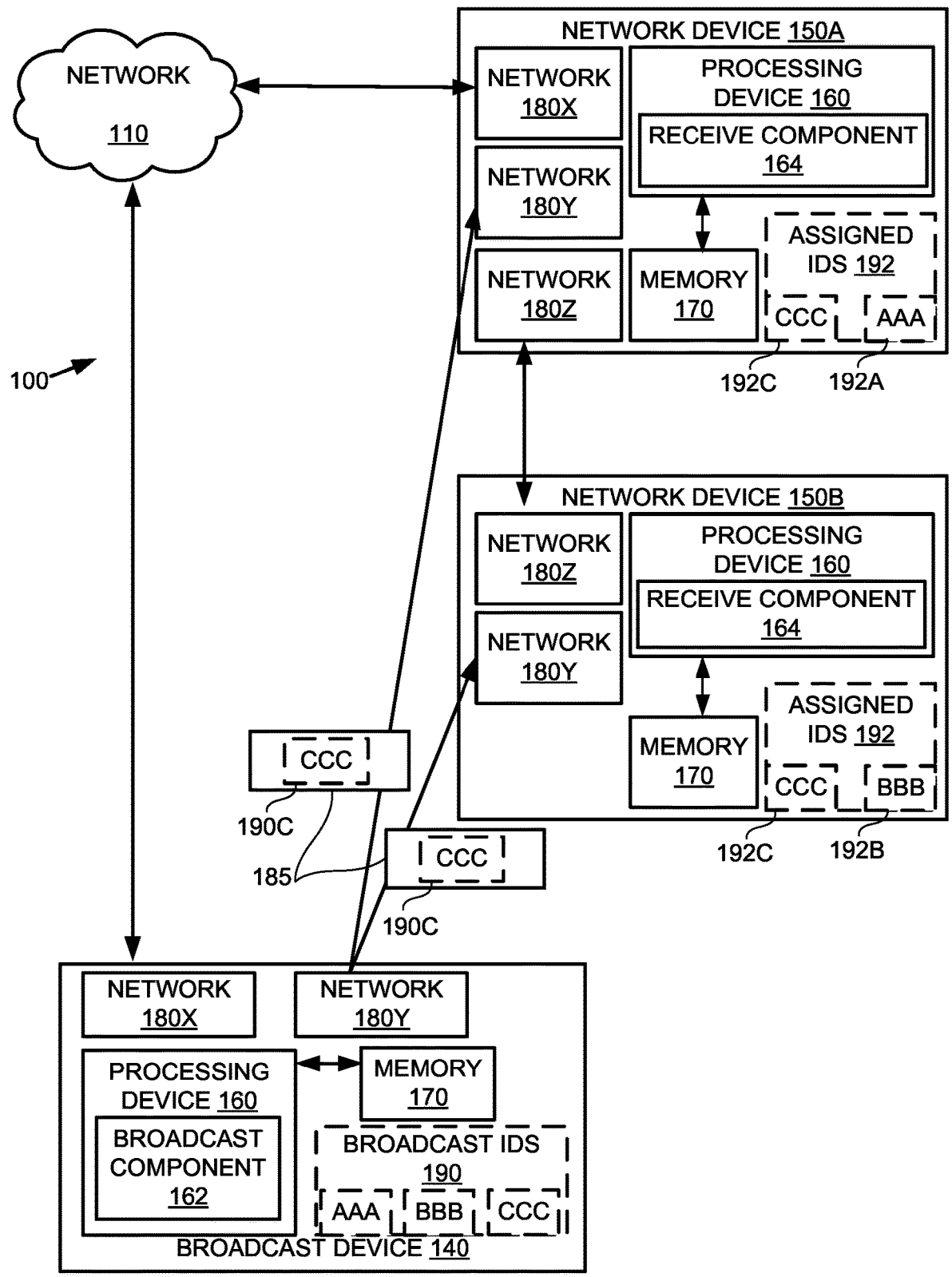
FIG. 3 is a block diagram that illustrates an example of a network architecture, in accordance with one or more aspects of the present disclosure.

FIG. 3 depicts a high-level component diagram of an illustrative example of the mesh network architecture 100, in accordance with one or more aspects of the present disclosure. FIG. 3 illustrates that the embodiments of the present disclosure are not limited to activation of a single network device 150.

Referring to FIG. 3, in some embodiments the broadcast message 185 from the broadcast device 140 may match more than one network device 150. For example, the broadcast device 140 may select a particular broadcast ID 190C ("CCC" in FIG. 3) that matches the assigned IDs 192 of more than one network device 150.

The network devices 150 may each contain storage having more than one assigned ID 192. As an example, the first and second network devices 150A, 150B may have storage containing two or more assigned IDs 192. As illustrated in FIG. 3, the selected broadcast ID 190C matches an assigned ID 192C of the assigned IDs 192 of both the first networking device 150A and the second networking device 150B. In response to the broadcast ID 190C matching one of the assigned IDs 192, both the first network device 150A and the second network device 150B may activate one or more of their components. FIGS. 1 and 3 illustrate that the broadcast message 185 sent from the broadcast device 140 can match a single network device 150 or multiple network devices 150, depending on the broadcast ID 190 that is transmitted.

The scenario illustrated in FIG. 3 may be useful, for example, in scenarios in which communications paths within the mesh network architecture 100 utilize relays. For example, if the broadcast device 140 wishes to communicate with the second network device 150B, the communication path may run through the first network device 150A, such as by way of the third network interface 180Z of the first network device 150A. Thus, by activating both the first network device 150A and the second network device 150B, the broadcast device 140 may establish a communication path to the second network device 150B through the mesh network architecture 100.

The broadcast IDs 190 of the broadcast device 140 may include multiple mappings for respective ones of the broadcast IDs to one or more of the network devices 150. A first broadcast ID 190 may map to a single network device 150 within the mesh network architecture 100 while a second broadcast ID (e.g., broadcast ID 190C) may map to a plurality of network devices 150. The broadcast device 140 may selectively choose a broadcast ID 190 for its broadcast signal 185 based on the one or more network devices 150 that the broadcast device 140 would like to activate.

Figure 4A:
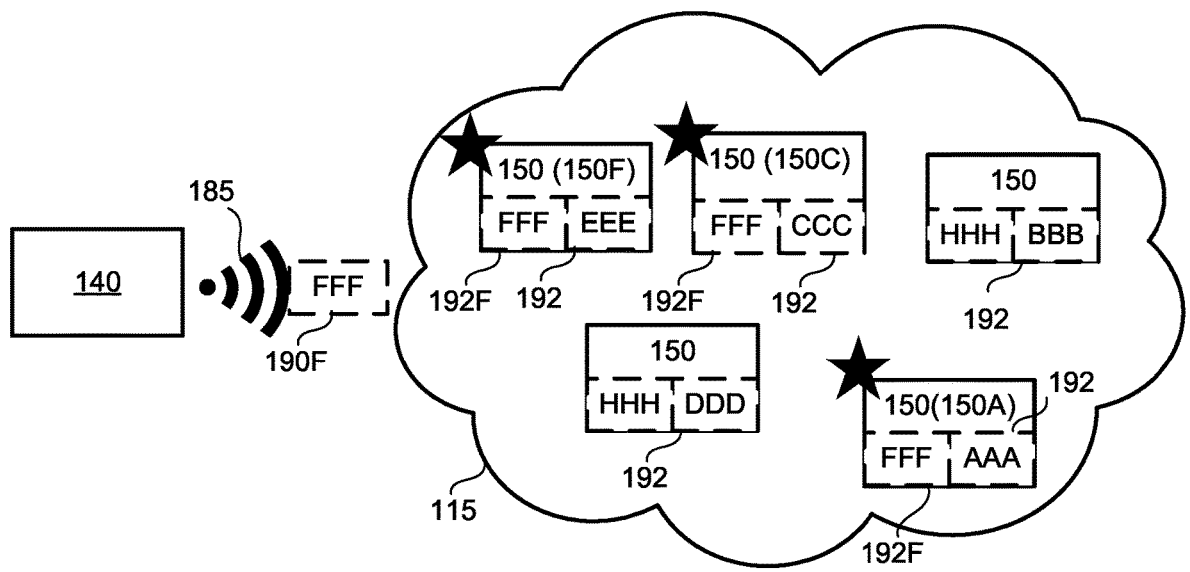
FIGS. 4A and 4B are schematic diagrams illustrating example scenarios of the broadcast activation of FIG. 3, in accordance with embodiments of the disclosure.
Figure 4B:
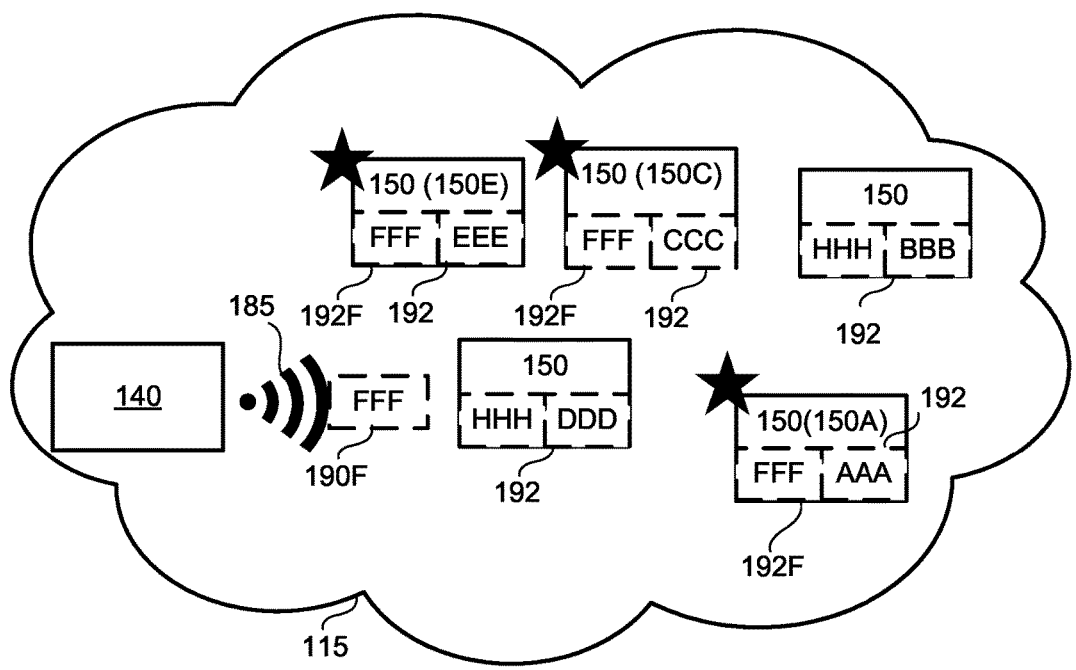

FIGS. 4A and 4B are schematic diagrams illustrating example scenarios of the broadcast activation of FIG. 3, in accordance with embodiments of the present disclosure. FIGS. 4A and 4B are similar in structure to FIGS. 2A and 2B. However, FIGS. 4A and 4B illustrate examples in which a broadcast ID 190F is provided in broadcast message 185 that matches more than one network device 150.

Referring to FIG. 4A, broadcast ID 190F (illustrated as "FFF" in FIG. 4A is provided within broadcast message 185. In FIG. 4A, the mesh network 115 contains a plurality of network devices 150, each having a plurality of assigned IDs 192. As an example, FIG. 4A illustrates that the broadcast ID 190F of the broadcast message 185 may match more than one of the network devices 150. For example, in FIG. 4A three network devices (150A, 150C, and 150E) are associated with an assigned ID 192F of their assigned IDs 192 that matches the broadcast ID 190F. In response to being associated with an assigned ID 192F that matches the broadcast ID 190F received in the broadcast message 185, the one or more network devices 150A, 150C, and 150F may activate one or more of their components (as illustrated by a star in FIG. 4A).

FIG. 4B illustrates that the broadcast device 140 may be part of the mesh network 115, in a manner similar to the scenario described in FIG. 2B. Thus, the broadcast device 140 may be selected from one or more of the network devices 150.

Figure 5:
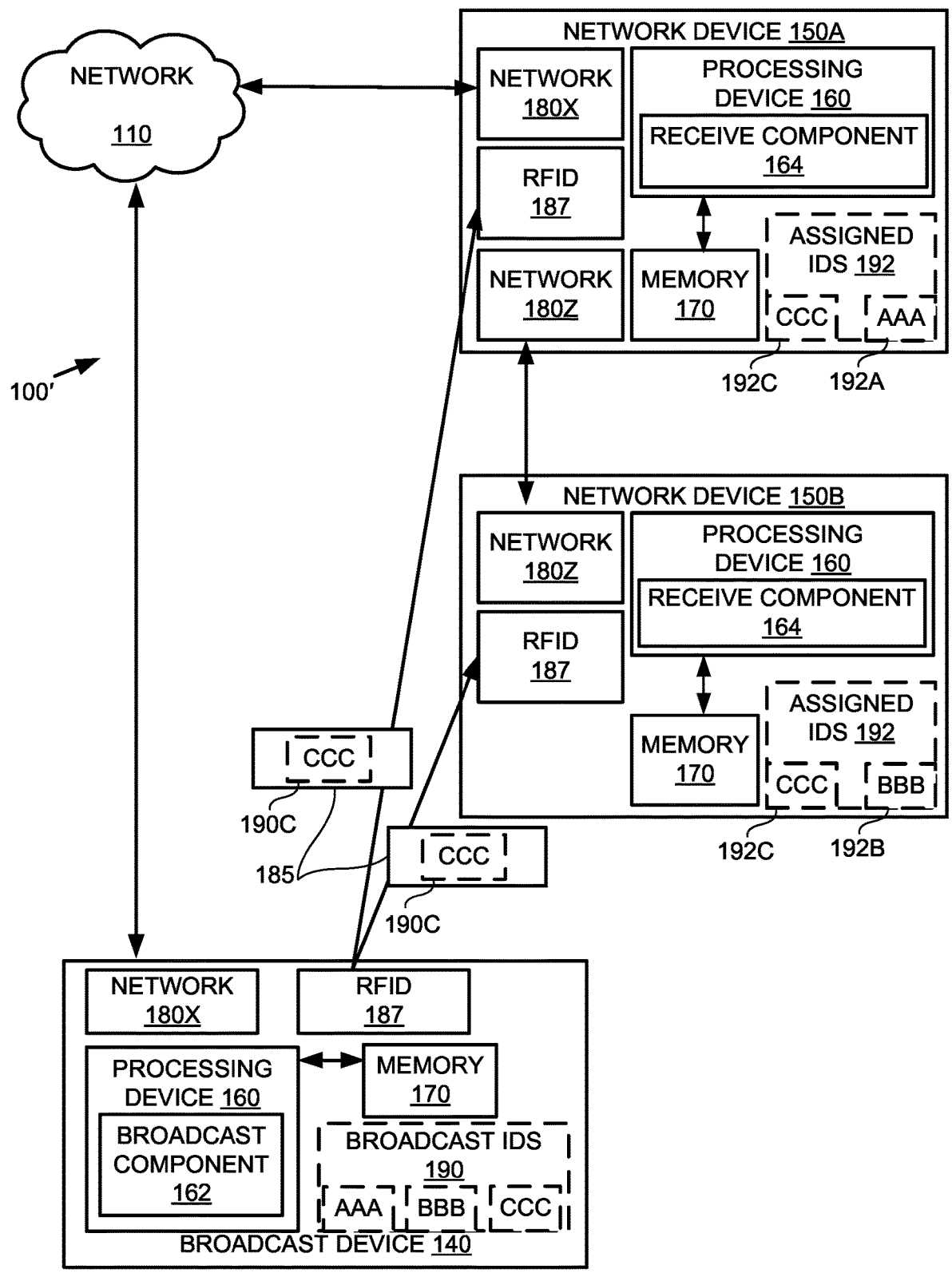
FIG. 5 depicts a high-level component diagram of an illustrative example of a mesh network architecture, in accordance with one or more aspects of the present disclosure.

FIG. 5 depicts a high-level component diagram of an illustrative example of a mesh network architecture 100', in accordance with one or more aspects of the present disclosure. In the mesh network architecture 100' of FIG. 5, the second network interface 180Y of FIGS. 1 and 3 has been instantiated as an RFID network interface 187. A description of elements of FIG. 5 that are the same or similar as previously described figures will be omitted for brevity.

An RFID system consists of at least an RFID receiver (e.g., an RFID tag) and an RFID transceiver (e.g., an RFID reader). The RFID tag can contain an antenna that provides reception and/or transmission to radio frequency queries from the RFID reader. RFID tags can utilize a number of frequencies. For example, frequencies associated with RFID tags can be low frequency (e.g., between about 125 to 134 kilohertz), high frequency (e.g., about 13.56 megahertz), ultra-high frequency (UHF) (e.g., about 430 to 434 megahertz and about 860 to 960 megahertz) and microwave (e.g., about 2.45 gigahertz and about 5.8 gigahertz). The RFID interface 187 may include functionality for an RFID transceiver (e.g., an RFID reader), an RFID receiver (e.g., an RFID tag), or both an RFID transceiver and an RFID receiver.

Referring to FIG. 5, the broadcast device 140 may act as an RFID reader and broadcast an RFID broadcast signal 185. As will be described further herein, the broadcast ID 190C may be provided within the RFID broadcast signal 185.

Each of the network devices 150 may include an RFID interface 187 as well. The RFID interface 187 of the network devices 150 may contain an RFID tag and/or circuitry to act as an RFID tag. The RFID interface 187 of the network devices may, in some embodiments, also be capable of acting as an RFID reader (e.g., so as to become a broadcast device 140).

In some embodiments, the RFID interface 187 of the network devices 150 may contain and/or be a passive RFID tag or an active RFID tag. When configured as an active RFID tag, the RFID interface 187 of the network devices 150 may have a power supply (e.g., a battery) associated with the RFID interface 187. The power supply may power an antenna and/or processing circuit that receives the broadcast message 185 from the broadcast device 140, compare the received broadcast ID 190 to the assigned IDs 192, as described herein, and, if the broadcast ID 190 matches one of the assigned IDs 192, to activate one or more components of the network device 150.

When configured as passive RFID tag, the RFID interface 187 of the network devices 150 may draw power from an induced current generated by the broadcast signal 185. For example, the broadcast signal 185 may be an electromagnetic signal that induces a current in an antenna associated with the RFID interface 187. The power supplied by the RFID interface 187 may be sufficient to power a processing device (e.g., processing device 160) sufficiently to compare the received broadcast ID 190 to the assigned IDs 192 of the network device 150 so as to take appropriate action (e.g., activate one or more components of the network device 150. In this way, a relatively low power interface (the RFID interface 187) may be utilized to transition the network device 150 from a dormant or near-dormant state to an active state without utilizing excessive additional power, or even a power supply.

The RFID interface 187 may receive a first of a plurality of signal pulses from the broadcast signal 185. The signal pulses of the broadcast signal 185 may provide power sufficient to activate the RFID interface 187. The RFID interface 187 may continue to receive pulses of the broadcast signal 185 after activation. The network device 150 may examine the received pulses to decode (e.g., by the processing device 160) the received broadcast ID 190 from the plurality of pulses. Once decoded, the received broadcast ID 190 can be compared as described herein.

Figure 6:
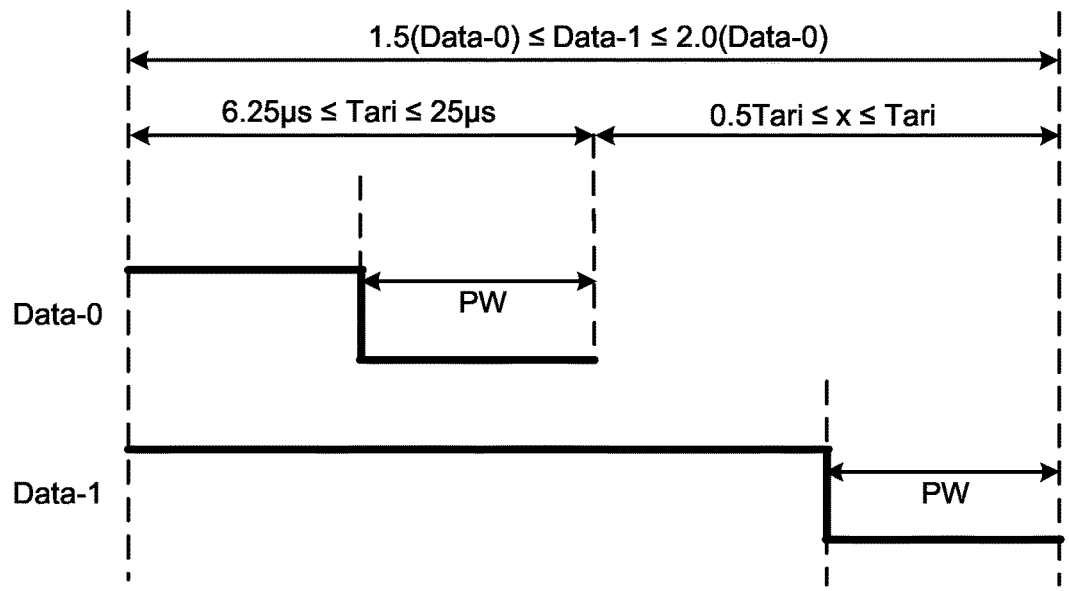
FIG. 6 illustrates an example waveform that can be used to encode a broadcast ID into a broadcast message, in accordance with embodiments of the disclosure.

As discussed herein, the broadcast message 185 may include a broadcast ID 190 that is encoded therein. FIG. 6 illustrates an example waveform that can be used to encode a broadcast ID into a broadcast message, in accordance with embodiments of the disclosure. FIG. 6 illustrates a technique that is used to modulate data in an RFID signal. However, the embodiments of the present disclosure are not limited to the technique illustrated in FIG. 6, and it will be understood that other techniques are possible without deviating from the scope of the present disclosure.

Referring to FIG. 6, pulse interval encoding (PIE) may be used to encode a broadcast ID into a broadcast signal, such as broadcast signal 185 described herein. PIE utilizes a series of pulses arranged in a particular format to modulate data into the broadcast signal. PIE is described, for example, in International Organization for Standardization and International Electrotechnical Commission protocol ISO/IEC 18000-6. As an example, a binary data value of "0" (Data-0) may be encoded by a short high level pulse followed by a low level pulse of equal length (length PW). The value of the high level signal plus the low level signal of the Data-0 value may be equal to a duration known as a Type A Reference Interval (TART). TART may be a duration between 6.25 µs and 25 µs. A binary data value of "1" (Data-1) may be encoded by a high level pulse followed by a low-level pulse of length PW. The duration of the Data-1 signal may be from greater than or equal to 1.5 times the Data-0 duration up to less than or equal to 2 times the Data-0 duration.

The PIE method illustrated in FIG. 6 is merely an example, and the embodiments of the present disclosure are not limited to this method for modulating data within the signal. It will be understood that any supported mechanism for encoding data within the broadcast signal of the second network interface (e.g., broadcast signal 185 of the second network interface 180Y of FIG. 2) or within the broadcast signal of an RFID interface (see FIG. 5) may be supported without exceeding the scope of the present disclosure. For example, in some embodiments, the broadcast ID may be encoded into the broadcast signal 185 by altering frequencies of the broadcast signal.

Figure 7A:
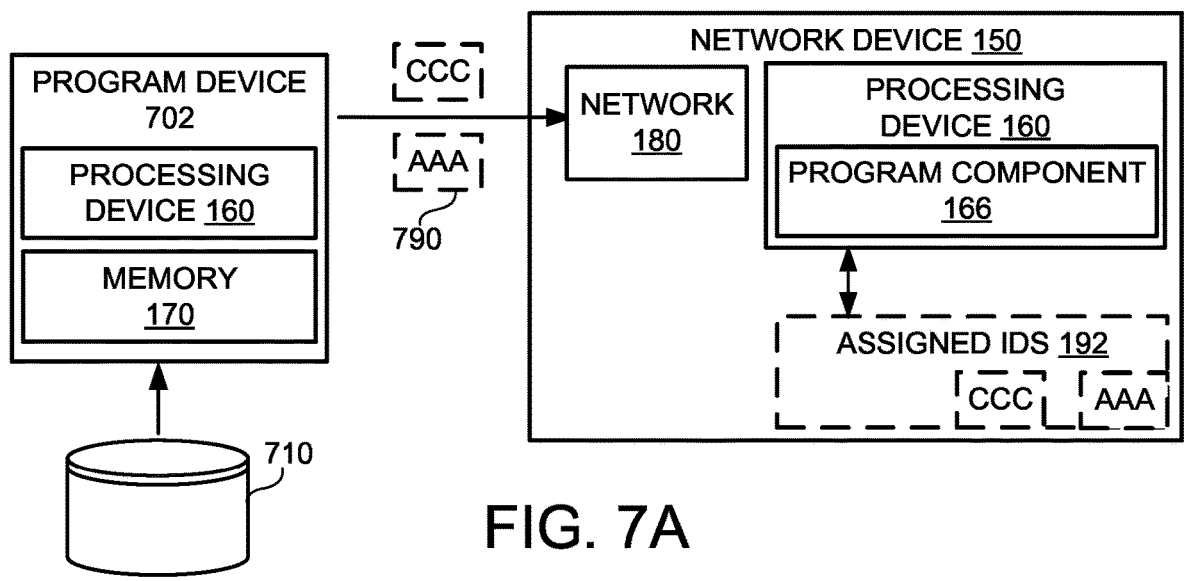
FIGS. 7A and 7B are schematic diagrams illustrating an example of programming assigned IDs to a network device, in accordance with embodiments of the disclosure.
Figure 7B:
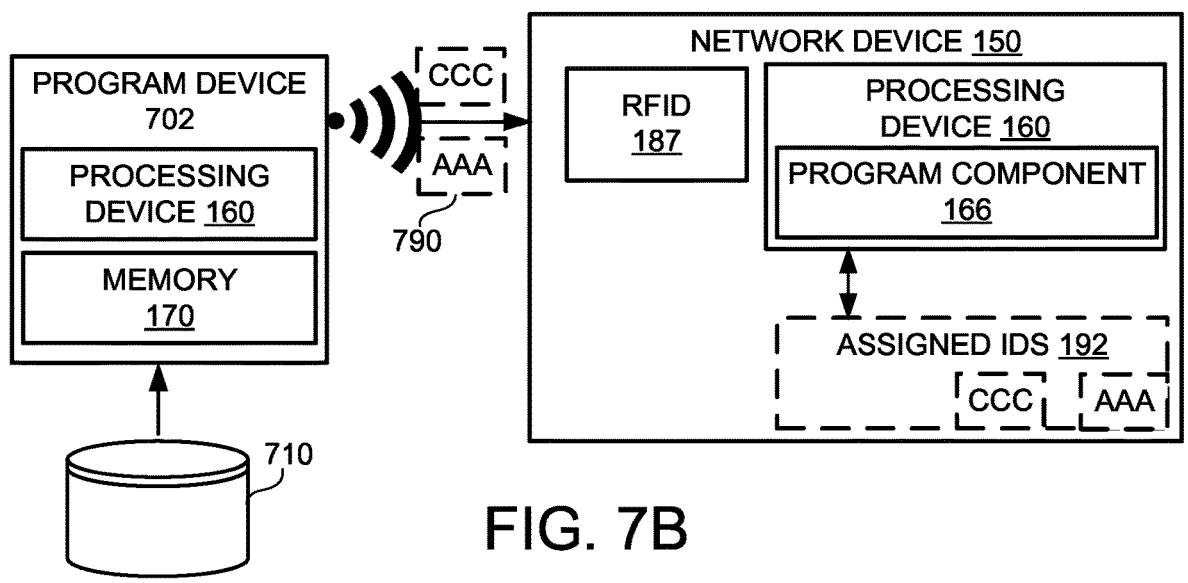

FIGS. 7A and 7B are schematic diagrams illustrating an example of programming assigned IDs to a network device 150, in accordance with embodiments of the disclosure. Referring to FIG. 7A, network device 150 may be programmed by program device 702. Program device 702 may include processing device 160 and memory 170. The processing device 160 and memory 170 of the program device 702 may be similar to the processing device 160 and memory 170 described herein with respect to FIG. 1 and a duplicate description thereof will be omitted for brevity.

Program device 702 may provide and/or program the network device 150 with one or more programmed IDs 790. For example, the program device 702 may provide the programmed IDs 790 to the network device 150 via network interface 180 of the network device 150. The network interface 180 may be compatible with and/or capable of interacting with a public network (e.g., the internet), a private network (e.g., a local area network (LAN) or wide area network (WAN)), or a combination thereof. In some embodiments, the network interface 180 may be an inter-integrated circuit (I2C) interface, a universal asynchronous reception and transmission (UART) interface, a serial peripheral interface (SPI), a universal serial bus (USB) interface, a Joint Text Action group (JTAG) interface, or the like.

In some embodiments, the programmed IDs 790 may be received on the network device 150 by the network interface 180 and be stored within the assigned IDs 192 data store. In some embodiments, the storing of the programmed IDs 790 within the assigned IDs 192 data store may be performed by a program component 166 executing on the processing device 160 of the network device 150, though the embodiments of the disclosure are not limited thereto.

In some embodiments, the network device 150 may be first placed in a programming mode before the programmed IDs 790 are stored. For example, a command or other indication may be provided via network interface 180 that indicates that programmed IDs 790 are to be provided for programming. In some embodiments, such a command or indication may be accompanied by authentication that is verified before the network device 150 programs the assigned IDs 192.

The program device 702 may access an ID database 710 for a determination of which programmed IDs 790 to provide to the network device 150. The ID database 710 may include mappings that uniquely identify a network device 150. The program device 702 may access the mapping to determine one or more programmed IDs 790 to program to the network device 150. The programmed IDs 790 may uniquely identify the network device 150 and/or a plurality of groups to which the network device 150 belongs. In some embodiments, the program device 702 may program the assigned IDs 192 of the network device 150 prior to the network device 150 being deployed (e.g., in manufacturing), but the embodiments of the present disclosure are not limited thereto. In some embodiments, the program device 702 may program the assigned IDs 192 of the network device 150 while the network device 150 is within the mesh network 115 (see, e.g. FIGS. 1-5). This may allow the assigned IDs 192 of the network device 150 to be updated in the field dynamically.

FIG. 7B illustrates an embodiment by which the network device 150 may be programmed over RFID. The embodiment of FIG. 7B differs from that of 7A in that the method by which the programmed IDs 790 are provided to the network device 150 is by an RFID broadcast to RFID interface 187 of the network device 150. A description of those elements of FIG. 7B that are similar or identical to that of FIG. 7A will be omitted for brevity.

The program device 702 may act as an RFID reader. As such, the program device 702 may transmit the programmed IDs 790 to an RFID interface 187 of the network device 150 utilizing the RFID protocol. For example, the program device 702 may provide the programmed IDs 790 by modulating an RFID signal broadcast to the network device 150. The broadcast signal may be received by the network device 150 and the programmed IDs 790 may be extracted from the received signal and stored in the assigned IDs 192 of the network device 150.

In some embodiments, the network device 150 may be first placed in a programming mode before the programmed IDs 790 are stored. For example, a command or other indication may be provided via the RFID interface 187 that indicates that programmed IDs 790 are to be provided for programming.

Figure 8:
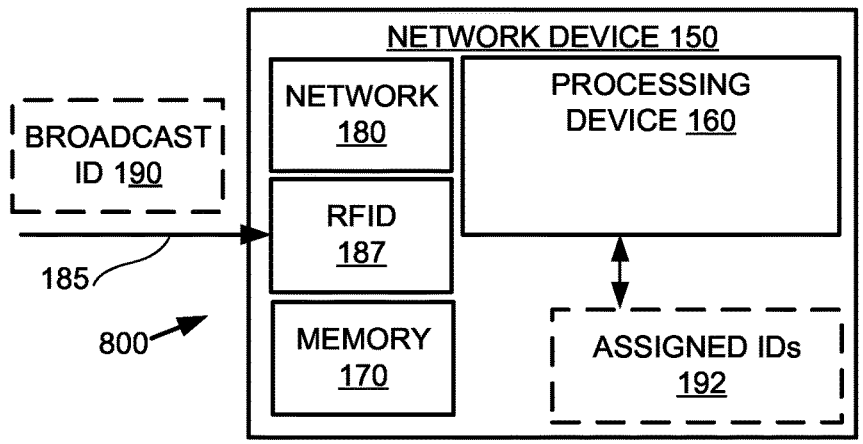
FIG. 8 is a component diagram of an example of a device architecture, in accordance with embodiments of the disclosure.

FIG. 8 is a component diagram of an example of a device architecture 800, in accordance with embodiments of the disclosure. The device architecture 800 includes network device 150, processing device 160, RFID interface 187, and network interface 180 of FIGS. 1, 3, and 5.

The network device 150 may receive an RFID broadcast signal 185 containing a broadcast identification value 190. In embodiments, the RFID broadcast signal 185 and broadcast identification value 190 of FIG. 8 may correspond to broadcast signal 185 and broadcast ID value 190C of FIGS. 1, 3, and 5, respectively. Assigned IDs 192 may correspond to assigned IDs 192 of FIG. 1, FIG. 3, and FIG. 5. It should be noted that the RFID broadcast signal 185, the broadcast identification value 190, and the assigned IDs 192 are shown for illustrative purposes only and are not physical components of network device 150.

Network device 150 may include a memory 170 that is operatively coupled to processing device 160. In embodiments, memory 170 may include volatile memory devices (e.g., random access memory (RAM)), non-volatile memory devices (e.g., flash memory) and/or other types of memory devices.

Figure 9:
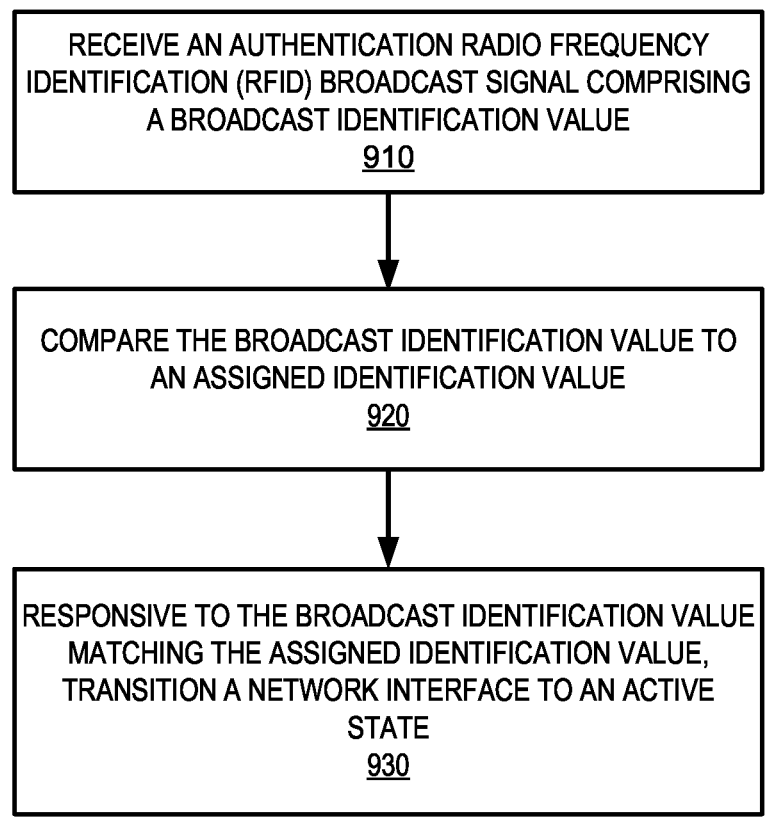
FIG. 9 is a flow diagram of a method of selectively activating components of a network device in response to an authentication broadcast signal, in accordance with some embodiments of the disclosure.

FIG. 9 is a flow diagram of a method 900 of selectively activating components of a network device in response to an authentication broadcast signal, in accordance with some embodiments of the disclosure. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 may be performed by the network device 150 of at least FIGS. 1, 3, and 5.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic receives an RFID broadcast signal. The RFID broadcast signal may include a broadcast identification value.

At block 920, the processing logic compares the broadcast identification value to an assigned identification value.

At block 930, responsive to the broadcast identification value matching the assigned authentication value, the processing logic transitions a network interface to an active state.

Figure 10:
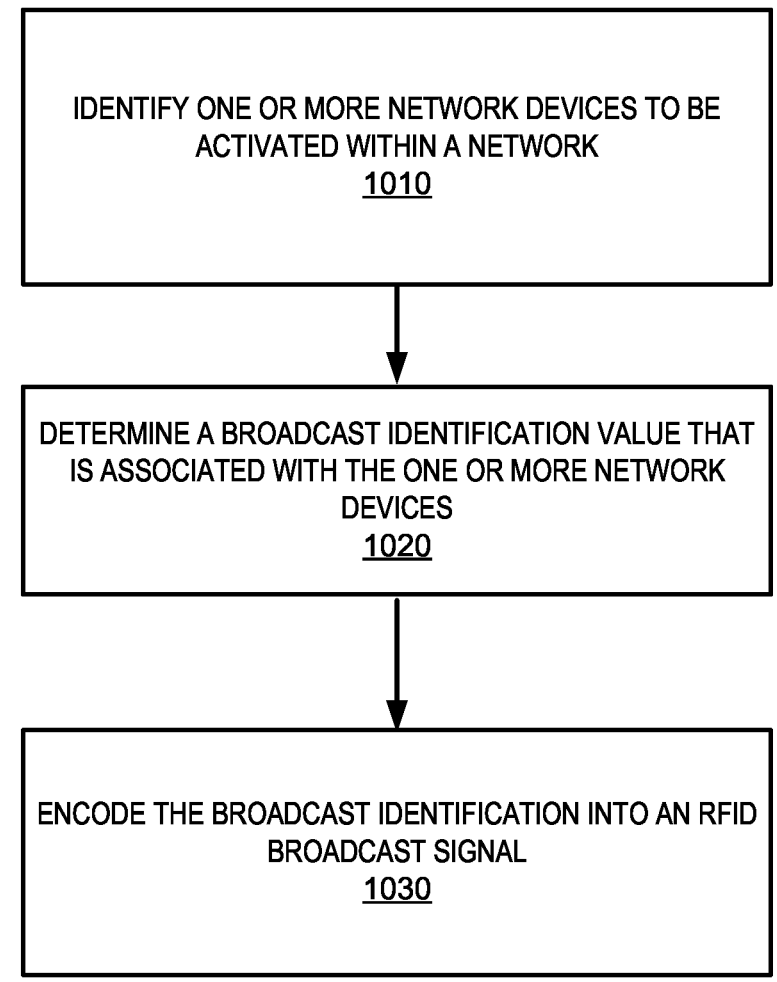
FIG. 10 is a flow diagram of a method of transmitting an authentication broadcast signal, in accordance with some embodiments of the disclosure.

FIG. 10 is a flow diagram of a method 1000 of transmitting an authentication broadcast signal, in accordance with some embodiments of the disclosure. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1000 may be performed by broadcast device 140 of at least FIGS. 1, 3, and 5.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Method 1000 begins at block 1010, where the processing logic identifies one or more network devices to be activated within a network.

At block 1020, the processing logic determines a broadcast identification value that is associated with the one or more network devices.

At block 1030, the processing logic encodes the broadcast identification into an RFID broadcast signal, as previously described. The RFID broadcast signal may be broadcast to the one or more network devices.

Figure 11:
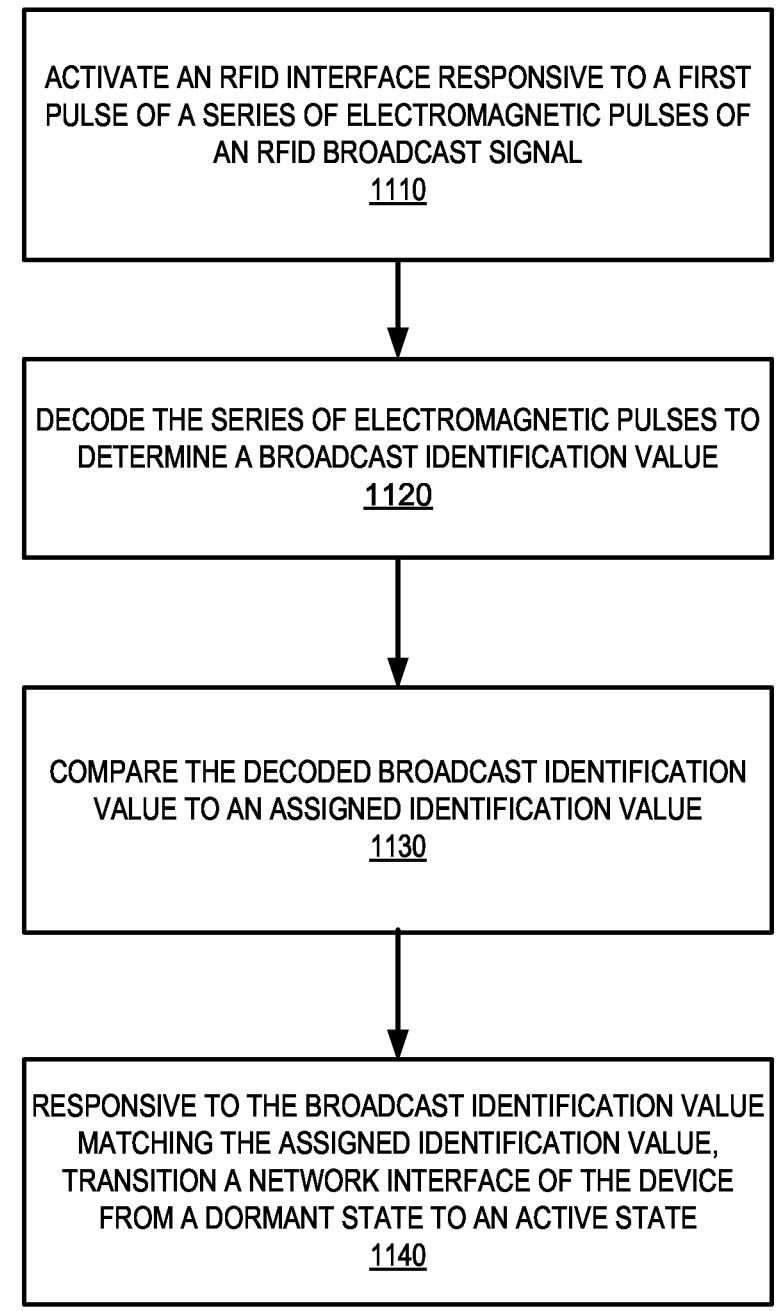
FIG. 11 is a flow diagram of a method of selectively activating components of a network device in response to an authentication broadcast signal, in accordance with some embodiments of the disclosure.

FIG. 11 is a flow diagram of a method 1100 of selectively activating components of a network device in response to an authentication broadcast signal, in accordance with some embodiments of the disclosure. Method 1100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1100 may be performed by network device 150 of at least FIGS. 1, 3, and 5.

With reference to FIG. 11, method 1100 illustrates example functions used by various embodiments. Although specific function blocks ("blocks") are disclosed in method 1100, such blocks are examples. That is, embodiments are well suited to performing various other blocks or variations of the blocks recited in method 1100. It is appreciated that the blocks in method 1100 may be performed in an order different than presented, and that not all of the blocks in method 1100 may be performed.

Method 1100 begins at block 1110, where the processing logic activates an RFID interface responsive to a first pulse of a series of electromagnetic pulses of an RFID broadcast signal.

At block 1120, the processing decodes the series of electromagnetic pulses to determine a broadcast identification value, as previously described.

At block 1130, the processing logic compares the decoded broadcast identification value to an assigned identification value.

At block 1140, responsive to the broadcast identification value matching the assigned identification value, the processing logic transitions a network interface of the device from a dormant state to an active state.

Figure 12:
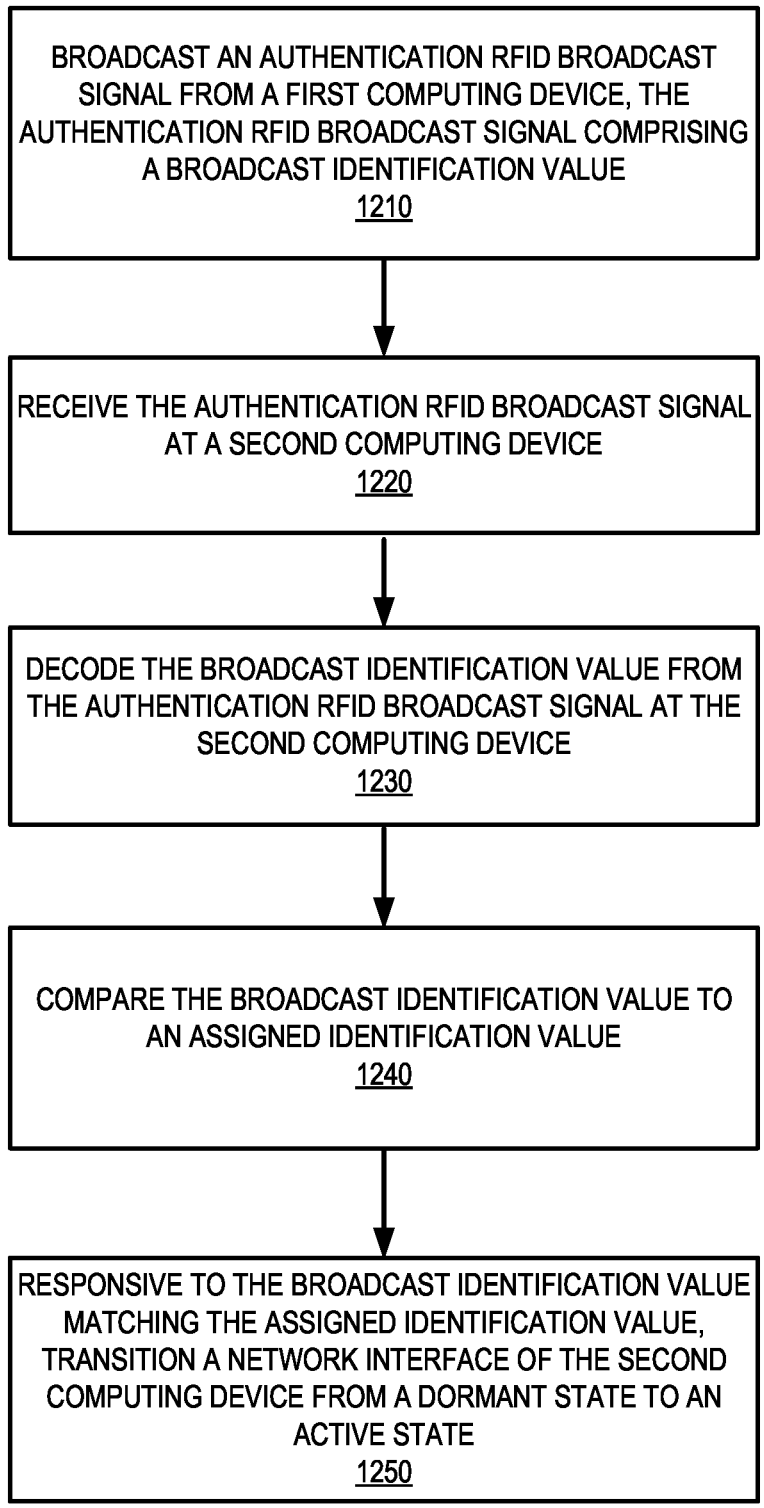
FIG. 12 is a flow diagram of a method of broadcasting an authentication signal and selectively activating components of a network device in response to the authentication broadcast signal, in accordance with some embodiments of the disclosure.

FIG. 12 is a flow diagram of a method 1200 of broadcasting an authentication signal and selectively activating components of a network device in response to the authentication broadcast signal, in accordance with some embodiments of the disclosure. Method 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1200 may be performed by network device 150 and/or broadcast device 140 of at least FIGS. 1, 3, and 5.

With reference to FIG. 12, method 1200 illustrates example functions used by various embodiments. Although specific function blocks ("blocks") are disclosed in method 1100, such blocks are examples. That is, embodiments are well suited to performing various other blocks or variations of the blocks recited in method 1200. It is appreciated that the blocks in method 1200 may be performed in an order different than presented, and that not all of the blocks in method 1200 may be performed.

Method 1200 begins at block 1210, where the processing logic broadcasts an authentication radio frequency identification (RFID) broadcast signal from a first computing device. In embodiments, the authentication RFID broadcast signal includes a broadcast identification value.

At block 1220, the processing logic receives the authentication RFID broadcast signal at a second computing device.

At block 1230, the processing logic decodes the broadcast identification value from the authentication RFID broadcast signal at the second computing device, as previously described.

At block 1240, the processing logic compares the broadcast identification value to an assigned identification value.

At block 1250, responsive to the broadcast identification value matching the assigned identification value, the processing logic transitions a network interface of the second computing device from a dormant state to an active state.

Figure 13:
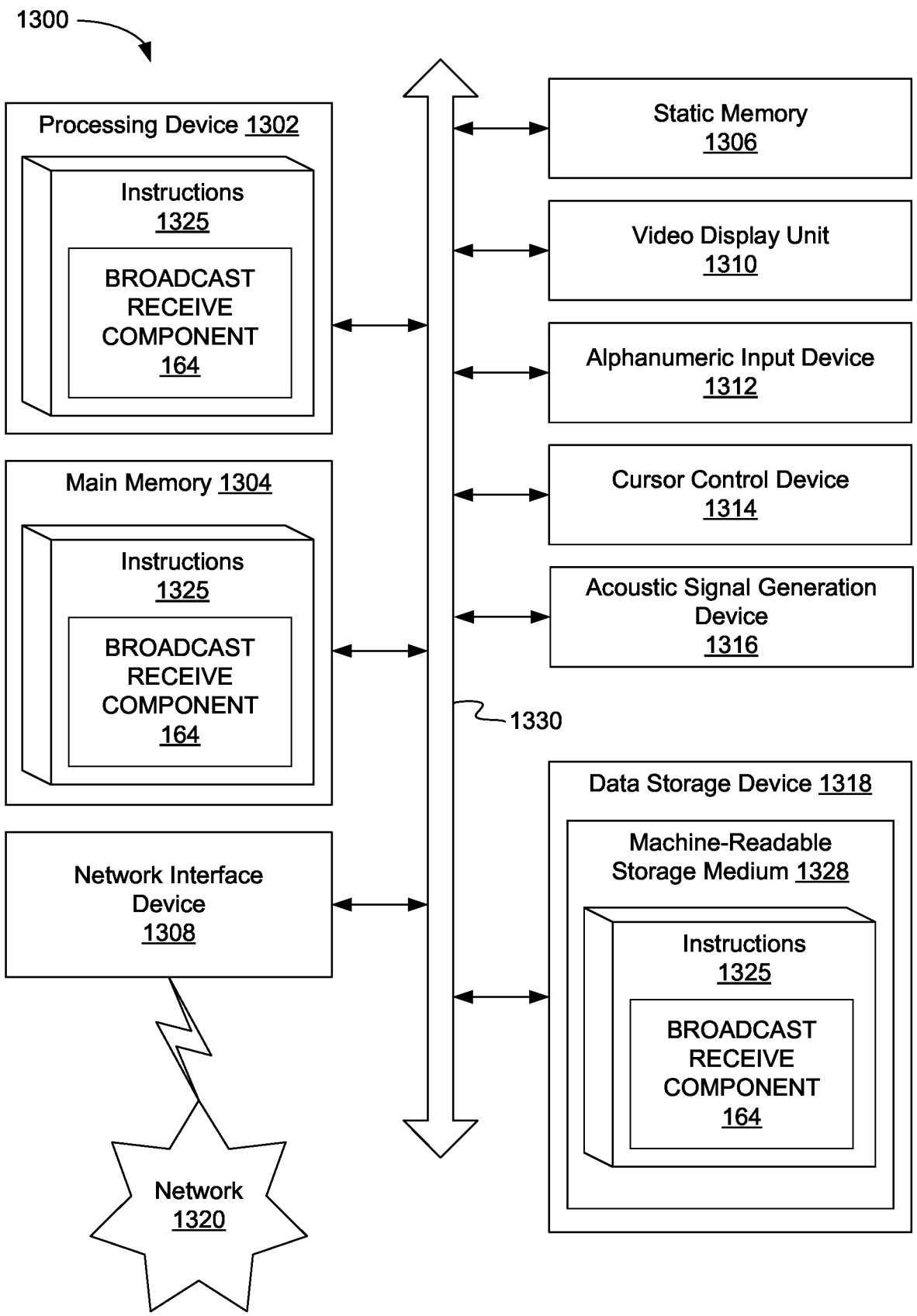
FIG. 13 is a block diagram of an example apparatus that may perform one or more of the operations described herein, in accordance with some embodiments of the disclosure.

FIG. 13 is a block diagram of an example computing device 1300 that may perform one or more of the operations described herein, in accordance with some embodiments of the disclosure. Computing device 1300 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1300 may include a processing device (e.g., a general purpose processor, a PLD, etc.) 1302, a main memory 1304 (e.g., synchronous dynamic random access memory (DRAM), read-only memory (ROM)), a static memory 1306 (e.g., flash memory and a data storage device 1318), which may communicate with each other via a bus 1330.

Processing device 1302 may be provided by one or more general-purpose processing devices such as a microprocessor, central processing unit, or the like. In an illustrative example, processing device 1302 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1302 may also include one or more special-purpose processing devices such as an application specific integrated circuit (ASIC), a field programmable gate array (FPGA), a digital signal processor (DSP), network processor, or the like. The processing device 1302 may execute the operations described herein, in accordance with one or more aspects of the present disclosure, for performing the operations and steps discussed herein.

Computing device 1300 may further include a network interface device 1308 which may communicate with a network 1320. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse) and an acoustic signal generation device 1316 (e.g., a speaker). In one embodiment, video display unit 1310, alphanumeric input device 1312, and cursor control device 1314 may be combined into a single component or device (e.g., an LCD touch screen).

Data storage device 1318 may include a computer-readable storage medium 1328 on which may be stored one or more sets of instructions 1325 that may include instructions for a broadcast receive component, e.g., broadcast receive component 164 for carrying out the operations described herein, in accordance with one or more aspects of the present disclosure. Instructions 1325 may also reside, completely or at least partially, within main memory 1304 and/or within processing device 1302 during execution thereof by computing device 1300, main memory 1304 and processing device 1302 also constituting computer-readable media. The instructions 1325 may further be transmitted or received over a network 1320 via network interface device 1308.

While computer-readable storage medium 1328 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: receiving a radio frequency identification (RFID) broadcast signal comprising a broadcast identification value; comparing the broadcast identification value to an assigned identification value; and responsive to the broadcast identification value matching the assigned identification value, transitioning, by a processing device, a network interface to an active state.

Example 2 is the method of Example 1, wherein transitioning the network interface to the active state comprises transitioning the network interface from a dormant state to the active state.

Example 3 is the method of any of Examples 1-2, wherein the RFID broadcast signal comprises a plurality of pulses.

Example 4 is the method of any of Examples 1-3, wherein the broadcast identification value is encoded into the RFID broadcast signal according to a pulse interval encoding protocol.

Example 5 is the method of any of Examples 1-4, wherein the assigned identification value comprises a plurality of assigned identification values, and wherein comparing the broadcast identification value to the assigned identification value comprises comparing the broadcast identification value to each of the plurality of assigned identification values.

Example 6 is the method of any of Examples 1-5, wherein the RFID broadcast signal is a first RFID broadcast signal, and wherein the method further comprises storing the assigned identification value into a data store responsive to receiving a command via a second RFID broadcast signal that authorizes programming the assigned identification value.

Example 7 is the method of any of Examples 1-6, wherein the network interface is to communicate with one or more network devices of a mesh network.

Example 8 is a system comprising: a memory; and a processing device, operatively coupled to the memory, to: identify one or more network devices to be activated within a network; determine a broadcast identification value that is associated with the one or more network devices; and encode, by the processing device, the broadcast identification into an RFID broadcast signal.

Example 9 is the system of Example 8, wherein the broadcast identification value is encoded into the RFID broadcast signal according to a pulse interval encoding protocol.

Example 10 is the system of any of Examples 8-9, wherein the RFID broadcast signal comprises a plurality of pulses.

Example 11 is the system of any of Examples 8-10, wherein the broadcast identification value is associated with a plurality of network devices.

Example 12 is the system of any of Examples 8-11, wherein the RFID broadcast signal is a first RFID broadcast signal, and wherein the processor is further to transmit a second RFID broadcast signal comprising a programmed ID for programming into the one or more network devices.

Example 13 is the system of any of Examples 8-12, wherein the second RFID broadcast signal is preceded by a command to authorize programming the programmed ID.

Example 14 is the system of any of Examples 8-13, wherein the one or more network devices are part of a mesh network.

Example 15 is the system of any of Examples 8-14, wherein the one or more network devices are nanotech devices.

Example 16 is the system of any of Examples 8-15, wherein the broadcast identification value is associated with a first networking device and a second networking device to be activated within the network, and wherein the system is to communicate with the second networking device via the network interface of the first networking device.

Example 17 is a non-transitory computer-readable storage medium including instructions that, when executed by a processing device, cause the processing device to: activate an RFID interface of a network device responsive to a first pulse of a series of electromagnetic pulses of an RFID broadcast signal; decode the series of electromagnetic pulses to determine a broadcast identification value; compare the decoded broadcast identification value to an assigned identification value; and, responsive to the broadcast identification value matching the assigned identification value, transition, by the processing device, a network interface of the network device from a dormant state to an active state.

Example 18 is the non-transitory computer-readable storage medium of Example 17, wherein the RFID broadcast signal comprises a plurality of pulses.

Example 19 is the non-transitory computer-readable storage medium of any of Examples 17-18, wherein the broadcast identification value is encoded into the RFID broadcast signal according to a pulse interval encoding protocol.

Example 20 is the non-transitory computer-readable storage medium of any of Examples 17-19, wherein the assigned identification value comprises a plurality of assigned identification values, and wherein to compare the broadcast identification value to the assigned identification value the processing device is to compare the broadcast identification value to each of the plurality of assigned identification values.

Example 21 is the non-transitory computer-readable storage medium of any of Examples 17-20, wherein the RFID broadcast signal is a first RFID broadcast signal, and wherein the processing device is further to store the assigned identification value into a data store responsive to receiving a command via a second RFID broadcast signal to authorize programming the assigned identification value.

Example 22 is the non-transitory computer-readable storage medium of any of Examples 17-21, wherein the network interface is to communicate with one or more network devices of a mesh network.

Example 23 is the non-transitory computer-readable storage medium of any of Examples 17-22, wherein the network interface comprises a network type that is different from the RFID interface.

Example 24 is the non-transitory computer-readable storage medium of any of Examples 17-23, wherein the RFID interface is to be operated from power induced by the RFID broadcast signal.

Example 25 is a method comprising: broadcasting an authentication radio frequency identification (RFID) broadcast signal from a first computing device, the authentication RFID broadcast signal comprising a broadcast identification value; receiving the authentication RFID broadcast signal at a second computing device; decoding the broadcast identification value from the authentication RFID broadcast signal at the second computing device; comparing the broadcast identification value to an assigned identification value; and, responsive to the broadcast identification value matching the assigned identification value, transitioning, by a processing device of the second computing device, a network interface of the second computing device from a dormant state to an active state.

Example 26 is the method of Example 25, wherein the authentication RFID broadcast signal comprises a plurality of pulses.

Example 27 is the method of any of Examples 25-26, wherein the broadcast identification value is encoded into the authentication RFID broadcast signal according to a pulse interval encoding protocol.

Example 28 is the method of any of Examples 25-27, wherein the second computing device is a nanotech device.

Example 29 is the method of any of Examples 25-28, wherein the second computing device is communicatively coupled to a third computing device through the network interface.

Example 30 is an apparatus comprising: means for receiving a radio frequency identification (RFID) broadcast signal comprising a broadcast identification value; means for comparing the broadcast identification value to an assigned identification value; and means for transitioning a network interface to an active state responsive to the broadcast identification value matching the assigned identification value.

Example 31 is the apparatus of Example 30, wherein the means for transitioning the network interface to the active state comprises means for transitioning the network interface from a dormant state to the active state.

Example 32 is the apparatus of Example 30-31, wherein the RFID broadcast signal comprises a plurality of pulses.

Example 33 is the apparatus of any of Examples 30-32, wherein the broadcast identification value is encoded into the RFID broadcast signal according to a pulse interval encoding protocol.

Example 34 is the apparatus of any of Examples 30-33, wherein the assigned identification value comprises a plurality of assigned identification values, and wherein the means for comparing the broadcast identification value to the assigned identification value comprises means for comparing the broadcast identification value to each of the plurality of assigned identification values.

Example 35 is the apparatus of any of Examples 30-34, wherein the RFID broadcast signal is a first RFID broadcast signal, and wherein the method further comprises means for storing the assigned identification value into a data store responsive to receiving a command via a second RFID broadcast signal that authorizes programming the assigned identification value.

Example 36 is the apparatus of any of Examples 30-35, wherein the network interface comprises a means to communicate with one or more network devices of a mesh network.

Unless specifically stated otherwise, terms such as "receiving," "comparing," "transitioning," "identifying," "determining," "encoding," "decoding," "activating," "broadcasting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving a radio frequency identification (RFID) broadcast signal comprising a broadcast identification value;
    comparing the broadcast identification value to an assigned identification value; and
    responsive to the broadcast identification value matching the assigned identification value, transitioning, by a processing device, a network interface to an active state, wherein the RFID broadcast signal is a first RFID broadcast signal, and wherein the assigned identification value is stored into a data store responsive to receiving a command via a second RFID broadcast signal that authorizes programming the assigned identification value.

2. The method of claim 1, wherein transitioning the network interface to the active state comprises transitioning the network interface from a dormant state to the active state.

3. The method of claim 1, wherein the RFID broadcast signal comprises a plurality of pulses.

4. The method of claim 1, wherein the broadcast identification value is encoded into the RFID broadcast signal according to a pulse interval encoding protocol.

5. The method of claim 1, wherein the assigned identification value comprises a plurality of assigned identification values, and
wherein comparing the broadcast identification value to the assigned identification value comprises comparing the broadcast identification value to each of the plurality of assigned identification values.

6. The method of claim 1, wherein the network interface is to communicate with one or more network devices of a mesh network.

7. A system comprising:
a memory; and
a processing device, operatively coupled to the memory, to:
receive a radio frequency identification (RFID) broadcast signal comprising a broadcast identification value;
compare the broadcast identification value to an assigned identification value wherein the assigned identification value comprises a plurality of assigned identification values, and wherein to compare the broadcast identification value to the assigned identification value the processing device is to compare the broadcast identification value to each of the plurality of assigned identification values; and
responsive to the broadcast identification value matching the assigned identification value, transition a network interface to an active state.

8. The system of claim 7, wherein to transition the network interface to the active state the processing device is to transition the network interface from a dormant state to the active state.

9. The system of claim 7, wherein the RFID broadcast signal comprises a plurality of pulses.

10. The system of claim 7, wherein the broadcast identification value is encoded into the RFID broadcast signal according to a pulse interval encoding protocol.

11. The system of claim 7, wherein the RFID broadcast signal is a first RFID broadcast signal, and
wherein the processing device is further to store the assigned identification value into a data store responsive to receiving a command via a second RFID broadcast signal that authorizes programming the assigned identification value.

12. The system of claim 7, wherein the network interface is to communicate with one or more network devices of a mesh network.

13. A non-transitory computer-readable storage medium including instructions that, when executed by a processing device, cause the processing device to:
receive a radio frequency identification (RFID) broadcast signal comprising a broadcast identification value;
compare the broadcast identification value to an assigned identification value; and
responsive to the broadcast identification value matching the assigned identification value, transition, by the processing device, a network interface to an active state, wherein the RFID broadcast signal is a first RFID broadcast signal, and wherein the processing device is further to store the assigned identification value into a data store responsive to receiving a command via a second RFID broadcast signal that authorizes programming the assigned identification value.

14. The non-transitory computer-readable storage medium of claim 13, wherein to transition the network interface to the active state the processing device is to transition the network interface from a dormant state to the active state.

15. The non-transitory computer-readable storage medium of claim 13, wherein the RFID broadcast signal comprises a plurality of pulses.

16. The non-transitory computer-readable storage medium of claim 13, wherein the broadcast identification value is encoded into the RFID broadcast signal according to a pulse interval encoding protocol.

17. The non-transitory computer-readable storage medium of claim 13, wherein the assigned identification value comprises a plurality of assigned identification values, and
wherein to compare the broadcast identification value to the assigned identification value the processing device is to compare the broadcast identification value to each of the plurality of assigned identification values.

* * * * *